Jan. 5, 1943.  J. M. LEATHERMAN  2,307,411
SAW HANDLE
Filed April 22, 1940
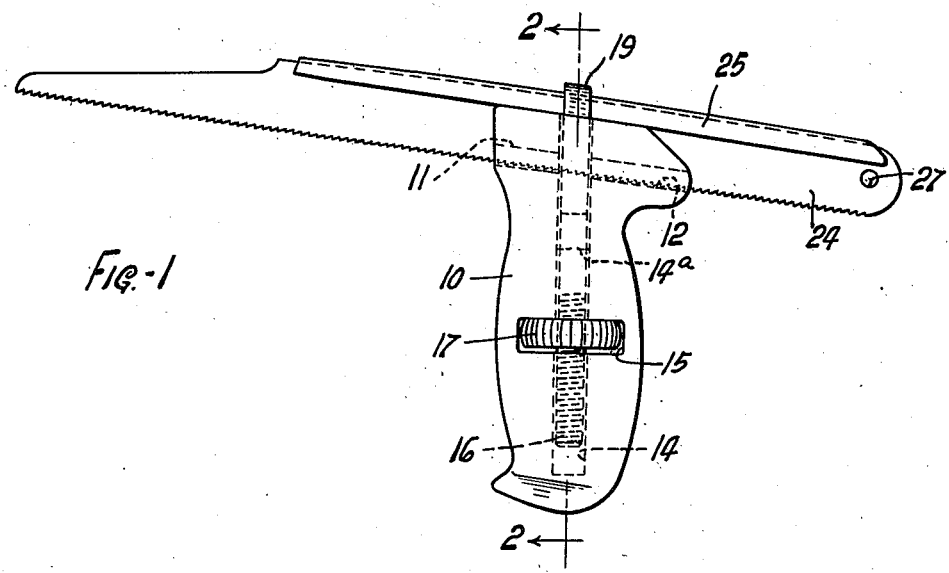
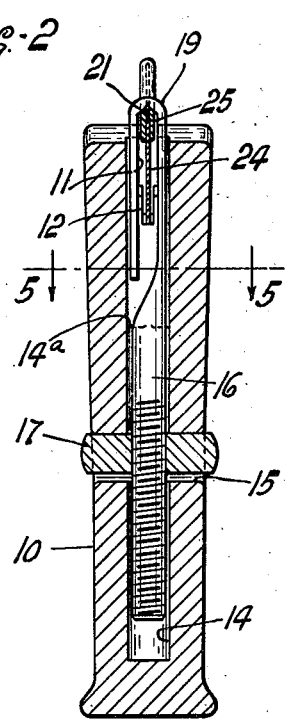
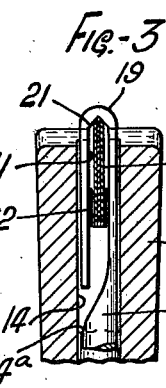
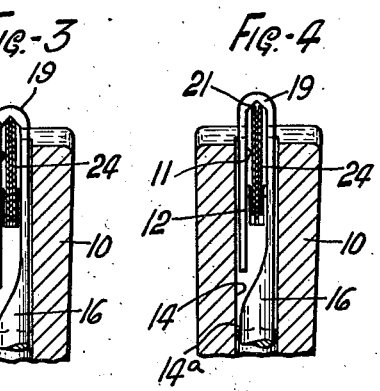
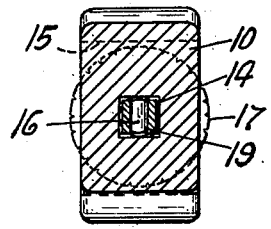
INVENTOR
JERRY M. LEATHERMAN
BY
ATTORNEYS Patented Jan. 5, 1943

2,307,411

UNITED STATES PATENT OFFICE 2,307,411

SAW HANDLE

Jerry M. Leatherman, Akron, Ohio

Application April 22, 1940, Serial No. 330,837

1 Claim. (Cl. 145—112)

This invention relates to saw handles, and more especially it relates to saw-blade holding devices of general utility adapted to hold a blade or blades selectively in a number of different positions according to the work to be performed.

The chief objects of the invention are to provide an improved saw-blade holding device of simple and inexpensive construction; to provide a saw handle capable of holding smaller type blades of various thicknesses, widths, and lengths; that will grip the blade at either end or at any point between its ends; that grips and holds as many as three blades at one time, with cutting edges disposed up or down, and with edges in flush or in offset relation to each other; that will hold broken blades; that does not require the use of tools to adjust or replace blades; and to provide a handle of the character mentioned that may be used with equal facility on tools other than saw blades. Other objects will be manifest as the description proceeds.

Of the accompanying drawing:

Figure 1 is a side elevation of the improved saw handle, and a blade therein;

Figure 2 is a section, on a larger scale, on the line 2—2 of Fig. 1;

Figure 3 is a fragmentary section of the top of the handle showing three blades held therein with cutting edges flush;

Figure 4 is a view similar to Fig. 3 showing three blades mounted with their cutting edges in offset relation; and Figure 5 is a section on the line 5—5 of Fig. 2.

Referring to the drawing there is shown a saw handle 10 of the so-called "pistol grip" shape that may be composed of metal, plastic, hard rubber, or wood. As it is positioned in Fig. 1, the top or upper end portion of the handle may be termed the "head," and the remainder thereof may be termed the "grip," the lower end of the latter being termed the "heel." The handle is somewhat wider in a fore and aft direction than in thickness, and the upper end face of the handle is somewhat sloped from front to rear, the rear of the head overhanging the grip somewhat to protect the hand of the user from contact with a blade or blades mounted in the head. The head, or upper end portion of the handle is bifurcated by a relatively wide slot 11 that extends from front to rear thereof, and a relatively narrow slot 12 disposed centrally in the bottom of slot 11, the bottoms of said slots being parallel to the sloped upper end face of the handle.

The handle 10 is formed with an axial bore 14 extending into its structure from the upper end thereof, said bore terminating within the handle structure adjacent the heel thereof. The upper end portion of bore 14 is square in section, as is best shown in Fig. 5, and the lower portion of the bore is circular in section, the juncture of said square and circular sections being shown at 14a. Formed in the grip of the handle is a slot or rectangular aperture 15, the bore 14 transecting the slots 11, 12 and the aperture 15. Mounted in the bore 14 is a bolt 16, the lower end portion of which is threaded through a nut 17 that is positioned within the aperture 15. The nut 17 is circular in shape and has a knurled perimeter, a portion of the latter extending beyond the opposite lateral faces of the handle 10, as is best shown in Fig. 2, to enable the nut to be rotated manually. The arrangement is such that by rotation of the nut 17 the bolt 16 may be moved axially in either direction.

At its upper end the bolt structure 16 is flattened and is bent back upon itself to form a downwardly opening hook 19. The cross-sectional dimensions of the hook 19 are such that it has an easy sliding fit within the square-section upper portion of the bore 14, the arrangement being such as to prevent rotation of the bolt 16 and its hook when the nut 17 is rotated. The hook 19 is so positioned in the bore 14 that it straddles the slots 11, 12 that bifurcate the head of the handle, so that blades in said slots may pass through the hook, and be engaged by the upper end thereof when the hook is drawn downwardly into the handle by the turning of the nut 17. The concave side of the hook, at the upper end thereof, is formed as a downwardly-open, inverted V-shaped notch 21, the function of which presently will be explained.

In Fig. 1 of the drawing the handle 10 is shown with a single blade 24 mounted therein, said blade being of the type usually used in hack saws, one end of the blade having been ground off to provide a somewhat pointed structure. When but a single blade is used, it is desirable that some means for stiffening the blade be employed, and to this end the metal channel 25 is provided. Said channel fits over the back of the blade, and grips the blade lightly so as readily to be applied thereto or removed therefrom. The blade 24 is received in the slots 11, 12, and as shown the teeth of the blade bear against the bottom of slot 12. The notch 21 at the upper end of bolt 16 hooks over the top of the stiffening channel 25, so that by the turning of the nut 17 to move the bolt 16 axially downwardly, the blade is clamped firmly in place and the channel 25 is retained securely upon the blade. The slot 11 is sufficiently wide to receive the channel 25 when the latter is applied to blades of narrower width than that shown, and the hook end of the bolt 16 may enter the upper end of bore 14 to exert clamping pressure against such blades of narrow width, the V-shape notch of the bolt hook serving to center the blade with relation to the bolt. Because the hook 19 is of sufficient width to straddle the slot 11, it is able, with equal facility, to engage a tool stucture of greater width than the slot 12, said tool structure being urged by the hook against the bottom of slot 11, at each side of the slot 12.

The arrangement is such that the blade may be mounted in the handle or removed therefrom speedily and with ease. Furthermore, the blade may be gripped at any point throughout its length, thus adapting it to various situations where blades of various lengths are required. If desired, the blade may be mounted in inverted position, with its teeth directed away from the handle, which arrangement is especially adapted for certain operations.

In some situations it is desired to saw slots of wider width than the width of a single blade and this readily may be accomplished with the improved handle of the invention by mounting a plurality of blades 24 in the handle in laterally abutting relation. Such an arrangement is shown in Fig. 3 which shows three blades 24 mounted side-by-side in the handle. It will be understood however that a greater or fewer number of blades may be employed, the maximum number being limited by the width of the slot 12. When a plurality of blades are employed, the stiffening channel 25 is dispensed with since the several blades provide lateral support for each other. The V-shaped notch 21 in the upper end of bolt 16 engages the two outermost blades of the plurality of blades, and urges them toward each other against the intermediate blades, as shown, thus providing adequate rigidity to the blade assembly to perform the work desired.

Sometimes it is desired to saw a slot that is deeper in its medial region than at each side thereof, and this is accomplished by mounting three blades 24 in the relative positions shown in Fig. 3, that is, with the teeth of the middle blade projecting beyond the teeth of the two laterally disposed blades. The blades may be assembled in this relationship in any desired manner, for example, by means of bolts utilizing the apertures in the ends of the blades, such as the aperture 27, Fig. 1, or by means of a small C-clamp (not shown) that grips the blades exteriorly of the handle.

From the foregoing it will be evident that the improved handle is capable of use in various ways to meet various conditions, and that it achieves the other advantages set out in the foregoing statement of objects.

Modification may be restorted to without departing from the spirit of the invention, or the scope thereof as defined by the appended claim.

What is claimed is:

A tool handle comprising a pistol grip structure formed in one piece with an enlarged head portion at one end thereof, a slot in said head extending from front to rear thereof and open along one side to the end of the handle, a slot of narrower width than the first mentioned slot disposed centrally in the bottom of the latter, said last mentioned slot being of a width sufficient to receive a plurality of blades in laterally abutting relation, a bore in said handle extending longitudinally thereof and intersecting said slots, a hook-like member mounted in said bore with its hook portion spanning both slots so as to be engageable with a tool structure positioned either in the wide or narrow slot, and to urge said tool structure against the bottom of said slot and means located intermediate the ends of the grip for moving said member longitudinally of the bore.

JERRY M. LEATHERMAN.